United States Patent [19]

Oyama

[11] Patent Number: 5,398,371
[45] Date of Patent: Mar. 21, 1995

[54] MULTIPLE LIP WIPER BLADE

[75] Inventor: Yoshisuke Oyama, Tokyo, Japan

[73] Assignee: Y. Corporation, Tokyo, Japan

[21] Appl. No.: 191,730

[22] Filed: Feb. 4, 1994

Related U.S. Application Data

[63] Continuation of Ser. No. 909,091, Jul. 2, 1992, abandoned.

[30] Foreign Application Priority Data

Aug. 6, 1991 [JP] Japan .................. 3-070158 U

[51] Int. Cl.$^6$ ........................................ B60S 1/38
[52] U.S. Cl. ........................ 15/250.41; 15/250.36
[58] Field of Search ......... 15/250.41, 250.36, 250.42, 15/250.40, 250.09, 250.37–250.39, 245

[56] References Cited

U.S. PATENT DOCUMENTS

| 1,853,715 | 4/1932 | Anderson | 15/250.36 |
| 3,224,027 | 12/1965 | Oishei et al. | 15/250.41 |
| 4,057,870 | 11/1977 | Priesemuth | 15/250.41 |
| 4,700,425 | 10/1987 | Rusnak | 15/250.41 |
| 4,723,336 | 2/1988 | Nakayama | 15/250.41 |
| 4,821,363 | 4/1989 | Delluc | 15/250.41 |

FOREIGN PATENT DOCUMENTS

| 2630383 | 10/1989 | France | 15/250.42 |
| 1261416 | 2/1968 | Germany | 15/250.41 |
| 2133270 | 1/1973 | Germany | 15/250.04 |
| 2253638 | 5/1973 | Germany | 15/250.41 |
| 2705700 | 8/1978 | Germany | 15/250.41 |
| 3130985 | 7/1983 | Germany | 15/250.41 |
| 3644693 | 6/1988 | Germany | 15/250.41 |
| 62-139164 | 6/1987 | Japan . | |
| 258243 | 10/1988 | Japan | 15/250.41 |
| 1316781 | 5/1973 | United Kingdom | 15/250.41 |
| 2038169 | 7/1980 | United Kingdom | 15/250.41 |

Primary Examiner—David A. Scherbel
Assistant Examiner—Gary K. Graham
Attorney, Agent, or Firm—Jacobson, Price, Holman & Stern

[57] ABSTRACT

A wiper blade of the present invention comprises two or three blades for wiping. The blades are longitudinally parallel and have their bases integrated into each other. The bases have deflective portions on the longitudinal outer sides of the integral body of the bases, so that the deflective portions serve to deflect one of the two outmost blades backward when one blade is ahead of the other and the wiper blade is performing a wiping action. The wiper blade of the present invention has a smaller edge height than a conventional wiper blade of a single blade, so that the former wiper blade may be easier to deform in conformity with a surface to be wiped, enabling a more stable wiping action and having a lower air resistance.

5 Claims, 2 Drawing Sheets

MULTIPLE LIP WIPER BLADE

This is a Continuation of application Ser. No. 07/909,091, filed Jul. 2, 1992, which was abandoned upon the filing hereof.

BACKGROUND OF THE INVENTION

The present invention relates to a wiper blade as wiping component of a wiper.

DESCRIPTION OF THE PRIOR ART

A conventional wiper for wiping a windshield of an automobile normally has only a single blade. For wiping the curved surface of the windshield, a wiper having lesser height is easier to deform transversely and hence more conformable in shape to the curved surface. However, a conventional wiper blade has a relatively larger height so that the blade is hard to deform and conform to the curved surface. This causes disadvantages such as concentration of pressure and easy-wearingness at the central portion of the blade.

In addition, the conventional blade with larger height has high air resistance and is unsuitable for rapid wiping (or when the automobile is moving at a high speed). This leads to poor wiping performance in heavy rain. A further disadvantage for the conventional wiper with a single blade is that rapid wiping requires the blade to have high strength and hence to be large and rigid, increasing the load on the motor that drives the wiper.

Since said single blade is excessively narrow in width, lacking enough strength in wiping direction to resist abrasion when wiping and causes frequent irregular vibration. The inventor of the present invention originated a wiper blade having double blades for wiping a windshield evenly and without leaving any unwiped portion on the surface, as is disclosed in Japanese Utility model laid open 63-139164. Though it serves to leave no unwiped portion, it is not sufficient to solve the other problems listed above.

SUMMARY OF THE INVENTION

It is an object of the present invention to decrease the height of the wiper blade so as to reduce its air resistance, at the same time making the wiper blade deformable in conformity with the contour of a curved surface, and further ensuring a stable wiping action.

This and other objects have been attained by the wiper blade having a blade body (1) elongated nearly perpendicular to the direction of wiping, comprising a plurality of blades (2) for wiping, characterized by said blades having two blades (2a and 2b) protruding perpendicular to one face of said blade body from the central portion of said one face toward a surface to be wiped, said two blades (2a and 2b) being longitudinally parallel, said two blades (2a and 2b) having bases integrated into each other, said bases having deflective portions (3a and 3b) on the longitudinal outer sides of the integral body of said bases, said deflective portions serving to deflect one of said two blades backward when said blade is ahead of the other blade and said wiper blade is performing a wiping action.

DETAILED DESCRIPTION OF PREFERRED EMBODIMENTS

First Embodiment

Figure 1:
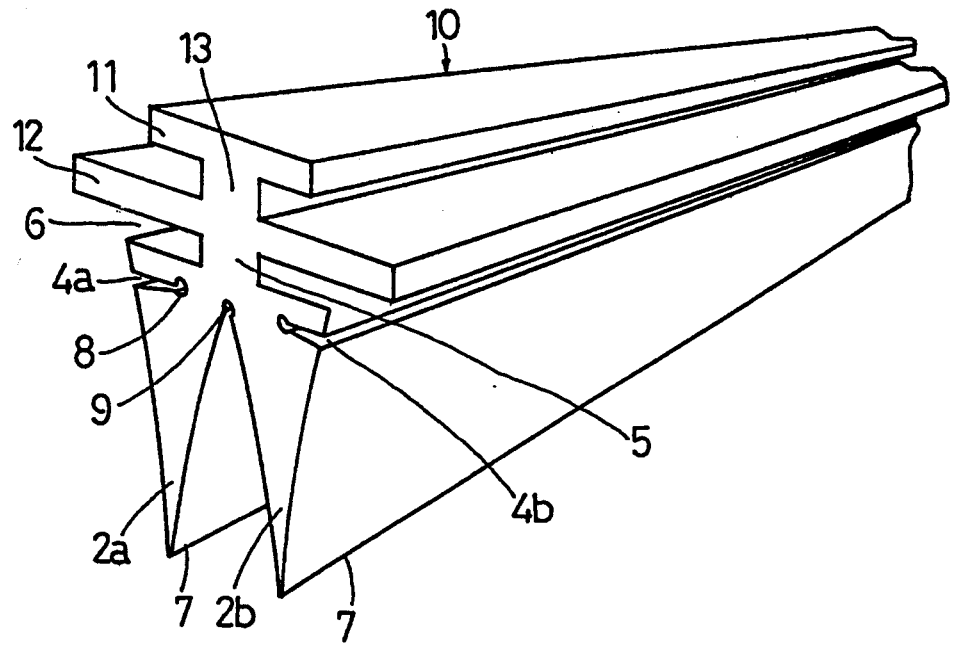
FIG. 1 is a perspective view showing a wiper blade of the first embodiment of the present invention.
Figure 2:
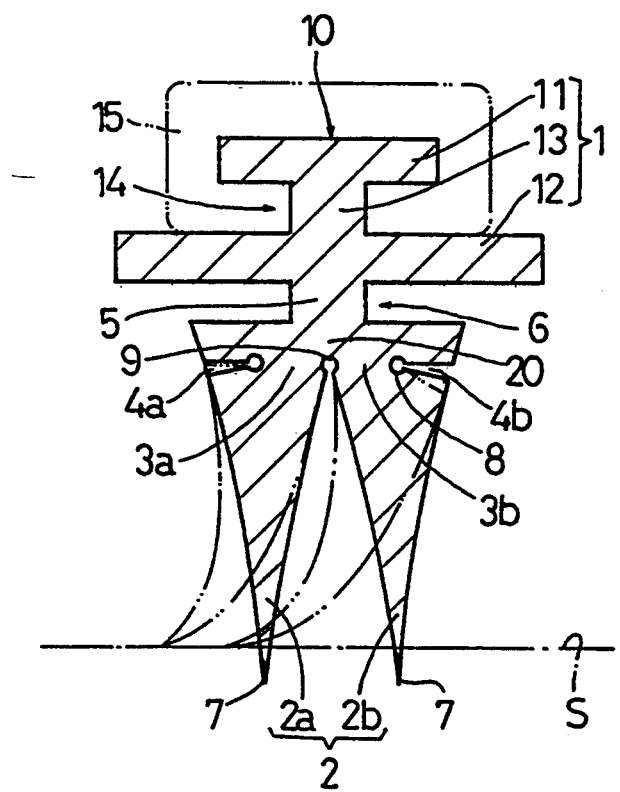
FIG. 2 is a transverse sectional view showing a wiper blade of the first embodiment of the present invention.

Referring to FIGS. 1 and 2, the reference numeral (1) indicates the blade body of the wiper blade (10). The blade body (1) consists of an end portion (11) for an engagement, a middle portion (12), and an intermediate portion (13). The end portion (11) is narrow and parallel to the surface to be wiped (S), and the middle portion (12) is wider than the end portion. The intermediate portion (13) is perpendicular to the surface (S) and links the end portion (11) to the middle portion (12). Thus, the blade body (1) has a longitudinally extending I-shaped cross section. And both sides of the intermediate portion (13) have two channels (14), which serve to engage the holder portion (15) of the wiper.

A central portion of an one-side under the blade body (1) connects, through a relatively narrow lower intermediate portion (5), to the blade portion (2). The intermediate portion (5) has clearances (6) at both sides to allow deflection of the blade portion (2).

The blade portion (2) having a pair of blades (2a and 2b) are formed with tapered edges (7). Each cross section of the blades has the same shape and size and are symmetric with respect to the face perpendicular to the surface to be wiped.

The blades (2a and 2b) are integrated with the base (20), thereby forming an inverted U-shaped cross section. This shape gives the blades (2a and 2b) strength particularly in the direction of wiping. The intermediate portion (5) links the base (20) to the blade body (1). Therefore, the deflectivity of the whole blades (2a and 2b) depends on the rigidity of the intermediate portion (5) and the base (20).

The reference numerals (3a and 3b) indicate deflective portions controlling the deflectivities of the blades (2a and 2b). The deflective portions (3a and 3b) have grooves (4a and 4b) formed as depths of cut on the longitudinal outer sides of the base (20). The grooves (4a and 4b) have V-shaped cross sections, and the V shape has a circular bottom (8) for the purpose of dispersing applied pressure.

The depths of the grooves (4a and 4b) may be changed to adjust the deflectivities of the deflective portions (3a and 3b). It is desirable that one of the blades (2a and 2b) be more deflective when one is ahead of the other blade during the wiping action. The grooves (4a and 4b) can have a very small width. The illustrations in FIGS. 1 and 2 exaggerate this width.

When the smallest possible width is selected, the grooves (4a and 4b) may be formed only a cutting into the bases (20). In this case, when the blades (2a and 2b) are in a wiping action, the deflectivity of the blade which settled back in the direction of wiping is nearly the same magnitude as if it had no depth of cut. The reference numeral 9 indicates a channel of a circular cross section between the blades (2a and 2b). Although the illustrations in FIGS. 1 and 2 are depicted vertically long, it is recommended that the height of the blades to their edges (7) should be smaller than the distances between the edges (7).

Second Embodiment

Figure 3:
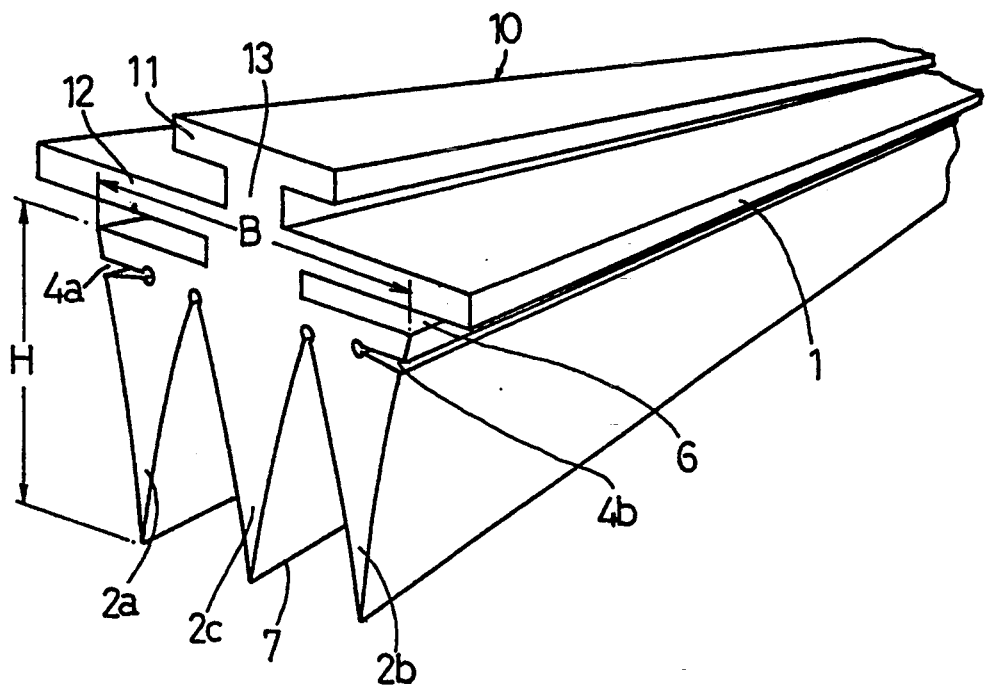
FIG. 3 is a perspective view showing a wiper blade of the second embodiment of the present invention.
Figure 4:
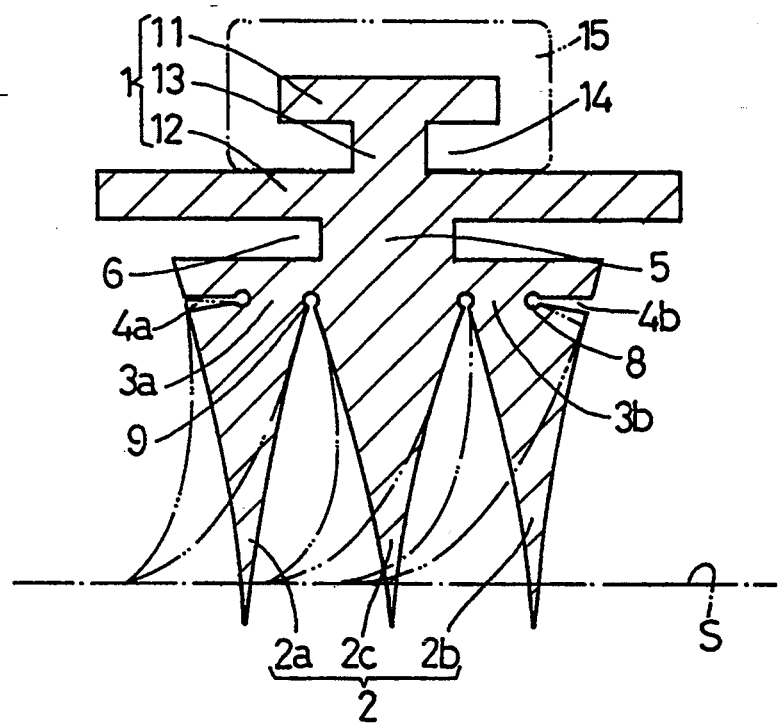
FIG. 4 is a transverse sectional view showing a wiper blade of the second embodiment of the present invention.

FIGS. 3 and 4 are illustrations showing a wiper blade (10) of a second embodiment of the present invention.

In the second embodiment, a blade body (1) has a third blade (2c) protruding perpendicularly and elongated longitudinally with the blades (2a, 2b). The third blade (2c) also has a cross section tapering to its edge (7). The base of the blade (2c) is continuously connected directly to the lower intermediate portion (5).

Said doubled blades (2a and 2b) are parallel to the third blade (2c), so that the blade (2c) is in between the blades (2a and 2b), forming a three-blade construction. This three-blade construction increase the blade's strength to the two-blade construction of the first embodiment.

The maximum width B of the whole bases of the blades (2a, 2b, and 2c) is set larger than the height H to the edge (7) of the blade portion (2). This makes it easier for the blade portion to deform in accordance with the curved surface to be wiped (S). The three-blade construction improves the wiping stability and that the height H can be minimized.

The blades (2a and 2b) may have the same value of the height H as the third blade (2c). As in the first embodiment, deflective portions (3a and 3b) also control the deflectivities of the blades (2a and 2b). One of the blades (2a and 2b) may be more deflective than the other when one is ahead of the other during the wiping action. The deflective portions (3a and 3b) have grooves (4a and 4b) formed on the longitudinal outer sides of the bases of the blades (2a and 2b).

A relatively large width B makes it possible for the blades (2a, 2b, and 2c) to have uniform contact with the curved surface to be wiped (S) during the wiping action. During this action, the leading blade (2a or 2b) is less firm (or more deflective as described above), than the other. Accordingly, the other blade (2a or 2b) and blade (2c) play a substantial role in the wiping action, while the one (2b or 2a) which is ahead bends and slants more and acts as a forerunner.

The leading blade (2a or 2b) slants and sometimes contacts the third blade (2c). Both the leading blade and the third blade (2c) play an integral role in the wiping.

The succeeding blade slants away from the leading blade. The succeeding blade is easily deflective until its groove closes. After the groove closing, the succeeding blade becomes firm, thus providing a triple wiping action.

Thus, in the first and second embodiments, the two-blade or three-blade construction provides for a wiper blade that has a much wider width compared to height, so that the wiper blade may be easy to deform in conformity with a surface to be wiped and may even contact a curved portion of the surface with evenly distributed overall length. Furthermore, the two-blade or three-blade construction provides easy longitudinal deformation, thereby eliminating the disadvantage of a conventional wiper blade that wears in positions subject to stronger stress under unevenly distributed pressure.

In addition to the above advantages, the height of the wiper blade of the present invention may be less than a conventional single blade wiper, so that the wiper of this invention may encounter lower air resistance and exhibit greater strength in the direction of wiping. This gives not only more stable wiping performance, but also a smaller load on the wiper-driving motor during high-speed wiping (when an automobile is moving at a high speed). A further advantage of the two-blade or three-blade construction of the present invention is that it provides such high strength that the wiper blade hardly vibrates and is resistant to disturbance.

What is claimed is:

1. A wiper element having an elongate blade body, first and second elongate wiper blades connected to said blade body, said blades being longitudinally parallel, said blades each being of triangular cross-section and having substantially contiguous bases integrated into each other with a circular channel therebetween, said blades having respective first sides facing towards each other and respective second sides facing away from each other, said blades having deflective portions defined by respective V-shaped grooves extending inwardly from the second sides of the blades, said deflective portions serving to permit deflection of one of said blades backward towards the other blade when said one blade is ahead of the other blade and said wiper element is performing a wiping action in a wiping direction perpendicular to a longitudinal axis of the blade body.

2. A wiper element as set forth in claim 1, which further comprises a third blade of triangular cross-section in between said first and second blades, said third blade being longitudinally parallel to said first and second blades, and said first, second and third blades having contiguous bases integrated into each other with circular channels therebetween.

3. A wiper element as set forth in claim 1, wherein said bases define an integral body having a breadth dimension transverse to said longitudinal axis at least equal to a height dimension of said two blades.

4. A wiper element as set forth in claim 1, wherein each groove has a circular bottom.

5. A wiper element as set forth in claim 1, wherein the bases of the blades define an integral body connected to the blade body by an intermediate portion having a breadth smaller than that of the integral body.

* * * * *